March 29, 1927.
F. H. VIETS
1,622,689
FLUID PRESSURE REGULATOR
Filed July 6, 1925    3 Sheets-Sheet 1
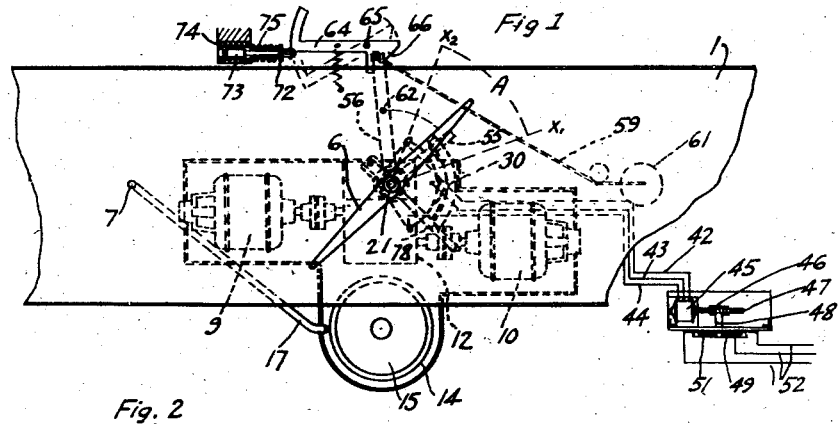
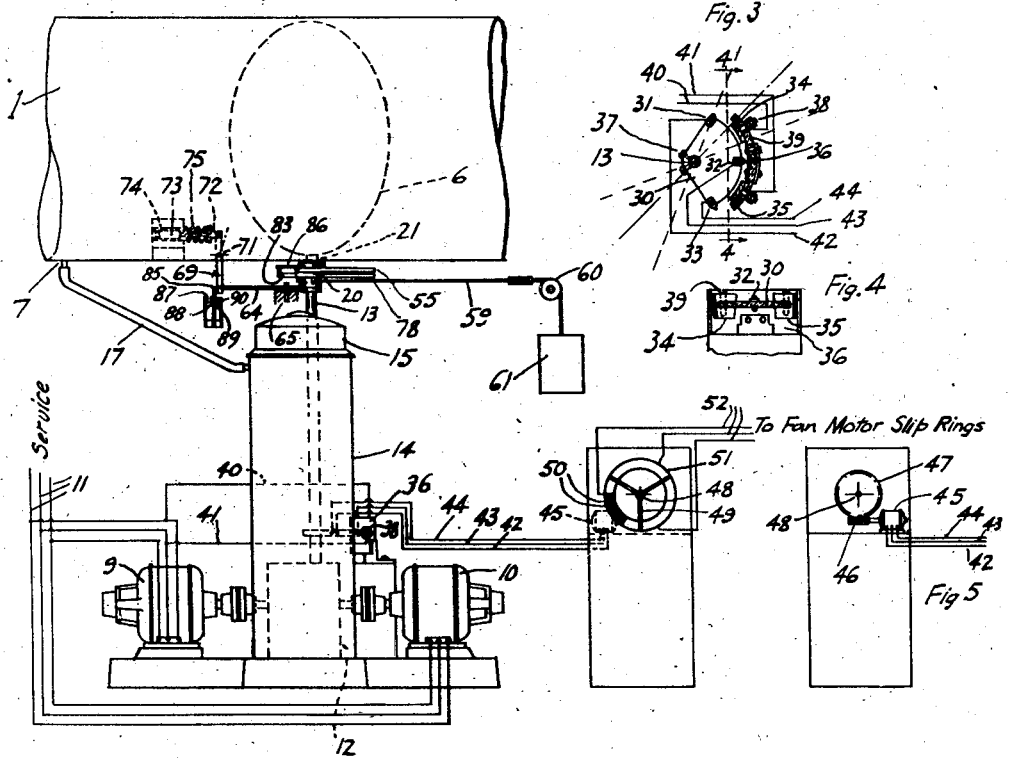
INVENTOR.
Floyd H. Viets
BY Arthur P. Knight
ATTORNEY March 29, 1927.
F. H. VIETS
1,622,689
FLUID PRESSURE REGULATOR
Filed July 6, 1925    3 Sheets-Sheet 2
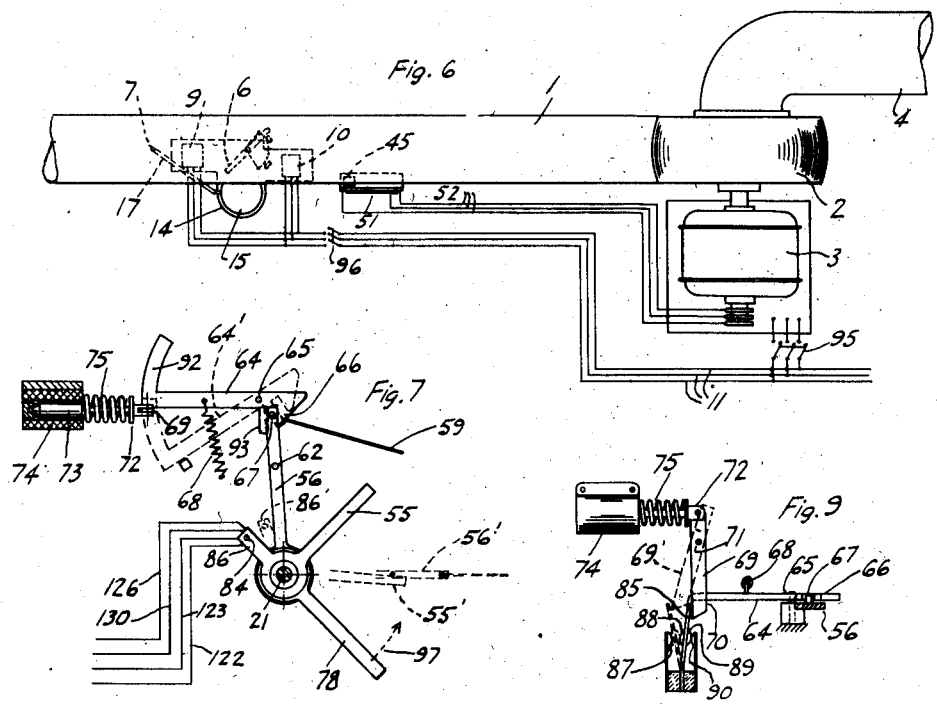
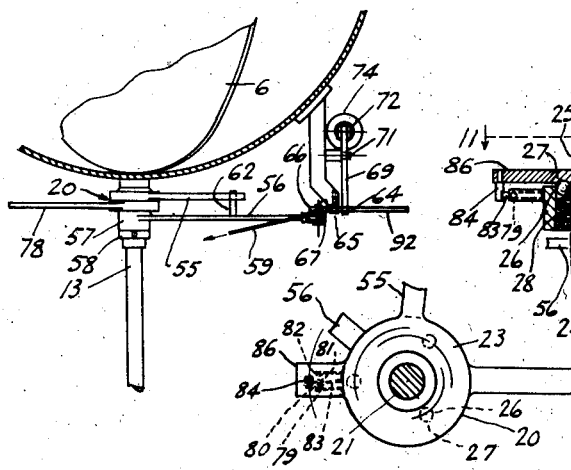
INVENTOR
Floyd H. Viets
BY Arthur P. Knight
ATTORNEY March 29, 1927.
F. H. VIETS
1,622,689
FLUID PRESSURE REGULATOR
Filed July 6, 1925
3 Sheets-Sheet 3
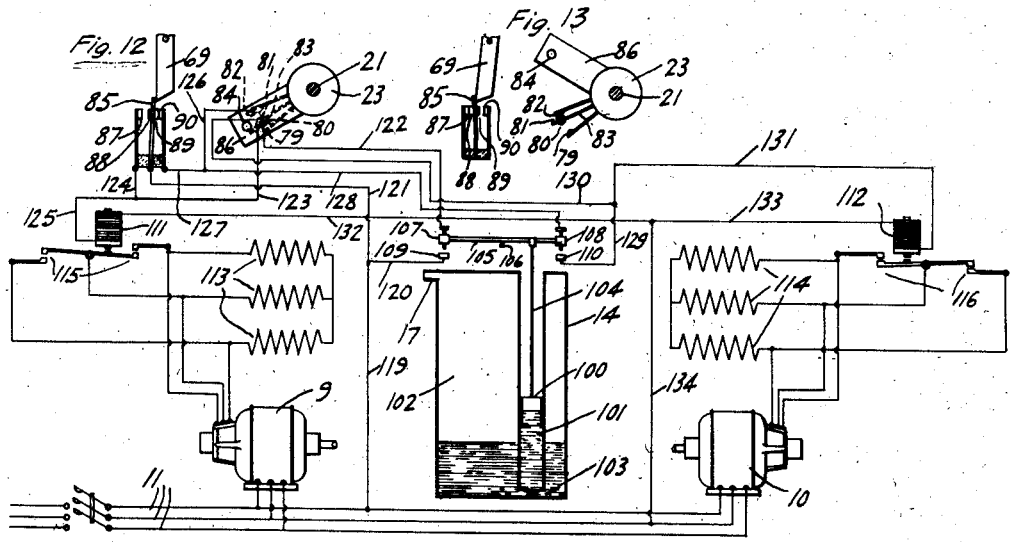
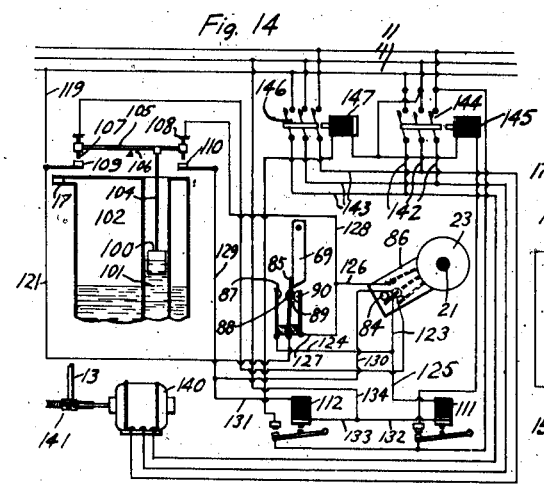
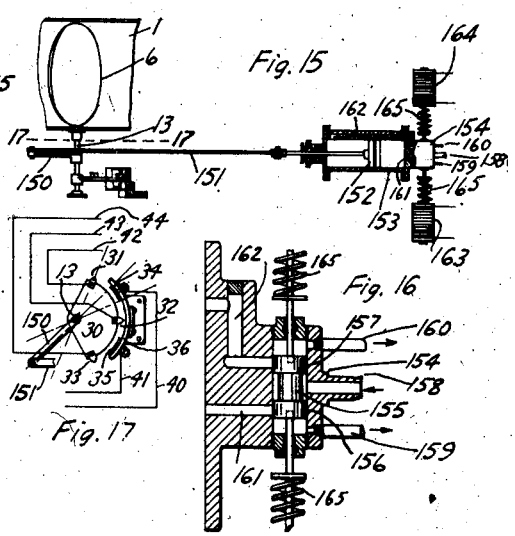
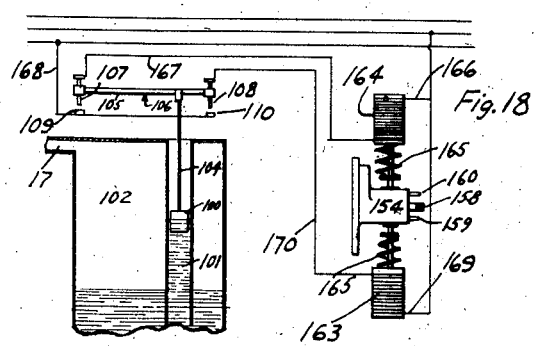
INVENTOR
Floyd H. Viets
BY Arthur P. Knight
ATTORNEY Patented Mar. 29, 1927.

1,622,689

UNITED STATES PATENT OFFICE.

FLOYD H. VIETS, OF ALHAMBRA, CALIFORNIA, ASSIGNOR TO INTERNATIONAL PRE-
CIPITATION COMPANY, OF LOS ANGELES, CALIFORNIA, A CORPORATION OF CALI-
FORNIA.

FLUID-PRESSURE REGULATOR.

Application filed July 6, 1925. Serial No. 41,630.

This invention relates to the regulation of the pressure in a flue through which a fluid is passing or in a chamber in which a fluid is being confined and the main object of the invention is to provide a more efficient means of regulation for this purpose. The main feature of my invention contemplates the use of a regulator in connection with a damper or other flow controlling device situated in a flue or passage through which a fluid is being pumped or driven by a fan or blower or other fluid moving device, and an important object of the invention is to provide means whereby large changes in pressure are effected by changing the speed of the fan or fluid moving device while smaller changes in pressure within certain limits are effected by operation of the damper or flow-controlling device under control of the regulator. In this manner the fan is permitted to operate at the highest efficiency, since it is automatically caused to slow down when the load lightens and to speed up again when the load increases. A further object of the invention is to provide means whereby the damper or other flow-controlling device is enabled to correct small variations in the pressure by movement thereof throughout a certain zone and whereby, when either limit of this zone of travel of the flow-controlling device is reached, any further requirement in correction of pressure will cause the speed of the fluid moving device to be automatically changed to effect the desired change in pressure, thus permitting the flow-controlling device to always remain in the prescribed zone of travel thereof and preventing the same from being moved either to wide open position or to full closed position at any time while the device is in operation.

A further object of the invention is to provide, in connection with an electrically operated regulator, means whereby failure of the electric current in the supply circuits for the regulator will cause the damper to automatically be brought to wide open position and remain there until the power is again turned on, together with means whereby upon the restoration of the electric current the damper will automatically be restored to normal operation under the influence of the regulator.

The accompanying drawings illustrate embodiments of my invention and referring thereto:

Fig. 1 is a plan view of the regulator and flow-controlling means, the flue being shown in section.

Fig. 2 is a front elevation of the apparatus shown in Fig. 1, also showing part of the wiring therefor.

Fig. 3 is a horizontal section through the commutator for controlling the operation of the speed control mechanism for the fan motor.

Fig. 4 is a vertical section of such commutator on line 4—4 in Fig. 3.

Fig. 5 is a rear elevation of the speed controlling means for the fan motor.

Fig. 6 is a plan view of the complete regulating system including the fan and the motor therefor, but with parts of the wiring omitted.

Fig. 7 is a plan view of parts of the mechanism for tripping and effecting re-engagement of the damper, parts being shown in section.

Fig. 8 is a side elevation of the parts shown in Fig. 7.

Fig. 9 is a detail elevation of the releasing means for the damper tripping mechanism.

Fig. 10 is a vertical section of the clutch means between the regulator and the damper, and adjacent parts.

Fig. 11 is a horizontal section on line 11—11 in Fig. 10.

Fig. 12 is a wiring diagram showing the operating and controlling circuits for the electrical regulator.

Fig. 13 is a diagrammatic view showing certain positions of some of the electrical contact means shown in Fig. 12.

Fig. 14 is a wiring diagram for a modified form of electrically operated regulator in connection with the invention.

Fig. 15 is a semi-diagrammatic vertical section showing the application of a mechanically operated regulator in connection with my invention.

Fig. 16 is a vertical section of the valve means shown in Fig. 15.

Fig. 17 is a horizontal section on line 17—17 in Fig. 15.

Fig. 18 is a wiring diagram showing the electrical control means for the mechanically operated regulator.

Referring first to Fig. 6 the apparatus there shown comprises a flue 1, a fan or other fluid moving device 2, provided with an electric driving motor 3, the gas or fluid to be driven by the fan being supplied thereto for example through flue 4. Within the flue 1 and adapted to control the passage of the fluid therethrough is located a damper or other flow-controlling device 6 and I have shown the regulating apparatus as adapted to maintain a constant or desired pressure at a point 7 in the flue just beyond such damper, although it will be understood that the device may be used for maintaining any desired pressure at any point in the flue beyond such damper or any point in a chamber or other apparatus in which such flue discharges.

For effecting the operation of the damper under the influence of the pressure at the point 7, any suitable type of regulator may be employed but I prefer in most cases to use an electrically operated regulator since the use of electrical control means greatly simplifies the entire construction for this purpose. Any of the well-known types of electrically operated fluid pressure regulators may be employed, but I have shown in the preferred form of my invention a regulator of the type described in the patent to J. H. Reineke, No. 1,480,837, dated January 15, 1924, reference being had to said patent for a detailed description of the construction and operation of such regulator. Said regulator comprises a pair of electric motors 9 and 10 connected to an electrical supply circuit 11. Said motors operate through differential gear means in gear box indicated at 12, which are in turn connected by gearing to the operating shaft 13. The arrangement of the differential gearing is such that when the motors 9 and 10 are rotating at equal speeds shaft 13 is stationary but an increase in the speed of one of said motors relative to that of the other will cause said shaft to rotate in one direction while an increase of the speed in the other motor will cause the shaft to rotate in the opposite direction. The construction and operation of the differential gear means are substantially as shown and described in Figs. 7 and 8 of said patent to J. H. Reineke. According to said patent, means are further provided for effecting changes in the speed of one motor or the other according as the pressure at the point 7 in the flue rises above or falls below the desired pressure. Such means may be enclosed with the float chamber casing 14 and cover 15 and may comprise float means 100 adapted to be raised or lowered due to the raising or lowering of the fluid level in the float chamber 101 under the influence of the pressure in flue 1, said pressure being communicated from said flue through pressure tube or pipe 17 to pressure chamber 102 within casing 14. Pressure chamber 102 communicates at its lower end with float chamber 101, as at 103, so as to permit passage of liquid between said chambers, and a suitable amount of liquid, such as oil, is placed therein. Float 100 is connected by vertical rod 104 to contact lever 105, which is pivoted at 106 and is provided at its ends with contact members 107 and 108 adapted to cooperate respectively with fixed contact members 109 and 110 to control connections in the electrical circuits of relays or electromagnets 111 and 112. The construction is such that if float 100 rises or falls from its equilibrium level, connection is established between contacts 107 and 109 or 108 and 110. Motors 9 and 10 may be any suitable type of variable speed motors, for example they may be 3-phase induction motors whose rotor windings are provided with resistances 113 and 114 respectively, said resistances being normally included in such field winding circuits but being adapted to be short-circuited therefrom so as to increase the speed of the corresponding motors. The means for accomplishing such short-circuiting of the resistances may comprise contact means 115 and 116 adapted to be controlled by electromagnets 111 and 112 aforesaid.

Operating shaft 13 is connected through friction clutch means indicated at 20 to the shaft 21 of damper 6. Said clutch means may comprise a pair of clutch members 22 and 23, the clutch member 22 being secured to shaft 13 for example by means of set screw 24 and clutch member 23 being secured to shaft 21 for example by means of set screw 25. A plurality of clutch devices for example balls 26 are provided in clutch member 22 adapted to cooperate with suitable means such as recesses or hollows 27 in clutch member 23, and springs 28 may be provided for holding the balls 26 into engagement with such recesses. In order to permit the clutch device to engage in only one relative position of shafts 13 and 21, so that in operation the damper will always be in the same relation to the operating shaft 13 of the regulator, the several balls 26 and the corresponding recesses 27 are preferably disposed at different distances from the center of the shaft as indicated in Fig. 11. During normal operation these balls are in engaged position and the members 22 and 23 are thus in engagement with one another, so that rotation of shaft 13 causes shaft 21 and damper 6 to turn therewith.

Means are provided for varying the speed of the driving motor 3 for fan 2 whenever damper 6 reaches a position at either end of a prescribed zone of travel as indicated at A in Fig. 1. Such means may comprise an insulating commutator segment 30 mounted upon operating shaft 13 and provided with three contact members 31, 32, and 33, adapted to engage contact members 34 and 35 mounted upon a suitable insulating support 36. Commutator segment 30 is preferably adjustable about the shaft 13 for example by means of set screws 37 and the position at which the contact points 31 to 33 are adapted to engage contacts 34 and 35 may also be adjusted by making the contact plates 34 and 35 wedge shaped as shown in Fig. 4 and mounted upon screws 38 which are adapted to slide up and down in adjusting slots 39 in the insulating support 36. Wire 40 leads from contact member 34, and wire 41 leads from contact member 35, to the electric supply circuit 11 (see Fig. 2). From the contact points 31, 32, and 33, wires 42, 43, and 44 lead to a small reversible motor 45, which is of such type that completion of the circuit through wires 42 and 43 causes the motor to rotate in one direction, while completion of the circuit through wires 43 and 44 causes it to rotate in the reverse direction. Said motor is adapted to drive worm 46 which engages worm wheel 47 mounted on shaft 48, upon which are also mounted the rheostat arms 49. Said arms make contact at their ends with the contact segments 50 of rheostat 51, which is connected by wires 51 to the rotor winding of the driving motor 3. Rotation of motor 45 in one direction or the other is thus adapted to move the arms 49 so as to increase or decrease the effective resistance of rheostat 51 in the rotor winding of the fan motor 3 and thereby vary the speed of the fan 2.

I also prefer to provide means whereby the failure of the electric current will cause the damper to be released from engagement with the regulator and to be moved to wide open position so as to prevent any injury to parts of the apparatus which might result if the damper were allowed to remain in closed or partly closed position without the regulating apparatus in operation, and also prevent loss of pressure due to partial constriction of the flue by the damper. Such means may comprise a tripping arm 55 mounted on the damper shaft 21 or, as shown, on the clutch member 23 connected thereto. Said arm 55 may extend in any suitable direction, for example it may extend, as shown, parallel or substantially parallel to the damper 6. A tripping lever 56 is also provided which is loosely mounted about shaft 13 or shaft 21 for example by means of a collar 57 loosely mounted about the hub of clutch member 22 and held in position thereon for example by means of collar 58 keyed or otherwise secured to such member. The outer end of tripping lever 56 is connected by a rope or cable 59 passing over a sheave 60 to a tripping weight 61 and said lever is also provided with a pin or lug 62 adapted to engage the tripping arm 55 when said lever is released and caused to swing by the weight 61. In order to release the tripping lever 56 at the proper time a catch member 64 may be provided, pivotally mounted at 65 and provided at its outer end with a projecting ear 66 adapted to engage a pin or lug 67 on lever 56, and hold the lever in its normal or inoperative position. Spring 68 is connected to catch member 64 in such manner as to tend to move the same to released position, but said member 64 is prevented from being so moved by engagement of a releasing finger 69 with the other end of member 64 as indicated at 70. The releasing finger 69 is pivoted as at 71 and is pivotally connected at its upper end to a plunger 72 which is connected to the core 73 of solenoid 74. Solenoid 74 is included in the electric circuit of the regulator motors, or at any suitable point in the electric circuit, and the arrangement is such that so long as said solenoid remains energized plunger 72 is attracted and releasing finger 69 is thereby held in position to engage catch member 64. Suitable means such as spring 75 are provided however which act upon plunger 72 and oppose the action of solenoid 74 so that upon de-energization of such solenoid the releasing finger 69 is moved to released position thereby permitting catch member 64 to operate to release tripping lever 56. It will be understood of course that by providing a solenoid of sufficient size it could be made to directly release catch member 64, but I prefer to employ the trigger mechanism above described, in order to permit use of a smaller solenoid.

Means are also provided for causing the operation of shaft 13 by the regulator when the electric power is again applied to restore the tripping lever 56 to normal position and bring the damper back into engagement with said shaft. For this purpose an arm 78 may be rigidly connected to shaft 13 or to the clutch member 22 thereon, said arm being adapted to engage pin 62 on tripping lever 56 to restore the same to normal position as hereinafter described. In order to provide for the proper operation of the regulator when the electric power is reapplied I also provide certain electrical connections which are included in the circuits for the regulator. Such electrical control means may comprise insulated contacts 79, 80, 81, and 82 mounted on clutch member 22, said contacts 80 and 81 being mounted on a leaf spring member 83, which tends by its spring action to hold contact 81 in engagement with contact 82 as shown in Fig. 13. A downwardly projecting pin 84 is mounted on arm 86 on clutch member 23, however, and is so positioned that when clutch members 22 and 23 are in engaged position pin 84 engages the outer end of spring member 83 and holds the same in position to cause contact member 80 to engage contact member 79, as shown in Figs. 11 and 12. Another set of insulated contacts 87, 88, 89, and 90 are provided adjacent releasing finger 69. Contacts 88 and 89 are mounted on a leaf spring member 85 which normally holds contact 89 in engagement with contact 90. The arrangement is such however, that when releasing finger 69 operates to release catch member 64, the lower end of finger 69 engages the end of spring member 85 and moves the same so as to bring contacts 87 and 88 into engagement. In order to hold the releasing member 69 in position to maintain closed connection between contacts 87 and 88 until the proper moment, in spite of re-energization of solenoids 74, the catch member 64 is provided with an arm or segment 92 which is adapted to engage finger 69 to hold the same in released position until the catch member 64 is restored to normal position to hold the tripping lever 56. Said catch member is also provided with an arm or finger 93 adapted to be engaged by pin 62 in the return movement of lever 56 to normal position so as to move said catch member to position to hold said lever.

Referring particularly to Fig. 12, the controlling circuits for the two-motor regulator above described are shown as follows. From one of the line wires 11 wire 119 leads to branch wires 120 and 121 which are connected respectively to contact 109 and to contacts 88 and 89. From contact member 107 wire 122 leads to contact 79. Contacts 80 and 87 are connected by wires 123 and 124 respectively and wire 125 to electromagnet 111. From contacts 82 and 90 wires 126 and 127 respectively lead to wire 128 which is in turn connected to contact 108. Contact member 110 is connected by wire 129 and branch wires 130 and 131 respectively to contacts 81 and electromagnet 112. From the two electromagnets 111 and 112 respectively wires 132 and 133 lead to return wire 134 which is connected to another line wire 11.

The operation of the above described apparatus is as follows:

The driving motor 3 for fan 2 is set in operation for example by closing switch 95 and the electrically operated regulator is also set in operation for example by closing switch 96, these switches serving to connect the motor 3 and the regulator motors 9 and 10 to the line 11. The fan 2 is thus operated so as to cause the fluid which is in this case a gas, such as for example fuel gas, to pass through flue 1. The gas or other fluid may be supplied to the fan through flue 4 under pressure, for example flue 4 may be connected to a gasometer at a gas works and fan 2, which is in that case called a booster fan, may be adapted to supply the added pressure necessary to give the desired pressure in flue 1 which is connected to the distributing system. The pressure at the point 7 in said flue depends both upon the speed of fan 2 and upon the position of damper 6 as well as upon the pressure in the gasometer and the rate of consumption of gas in the system. With the regulator set to maintain a certain pressure and with the fan 2 operating at approximately the proper speed to maintain such pressure, slight variations in the pressure at the point 7 will cause the regulator to operate through a change in the speed of one or the other of the motors 9 or 10 to move the damper toward closed or open position to bring the pressure back to the desired value.

For example if the pressure at 7 increases above the desired value, float 100 rises, causing connection to be closed between contacts 107 and 109. The energizing circuit of electromagnet 111 is thus completed through wires 119 and 120, contacts 109 and 107, wire 122, contacts 79 and 80, and wires 123, 125, 132, and 134, causing said electromagnet to close contact means 115, thus short-circuiting resistance means 113 and causing motor 9 to rotate at increased speed. The arrangement of the differential gearing connecting the regulator motors to the operating shaft 13 is such that this increase in speed of motor 9 causes the damper to be moved toward closed position, and this movement is continued until the pressure is again reduced to the desired point when float 100 falls and breaks connection between contacts 109 and 107. On the other hand a decrease in pressure causes connection to be closed between contacts 108 and 110 and current then passes through wires 119 and 121, contacts 89 and 90, wires 127 and 128, contacts 108 and 110, wires 129 and 131, electromagnet 112, and wires 133 and 134. Energization of electromagnet 112 results, in a similar manner in an increase in speed of motor 10 and a consequent opening movement of the damper which continues until the equilibrium pressure is again restored. Small fluctuations in the pressure are thus taken care of by operation of the damper without effecting the speed of the driving motor 3.

Damper 6 however is only permitted to move through a prescribed range for example through the angle indicated at A in Fig. 1, and if the movement of the damper within this range is not sufficient to effect the desired correction in the pressure, such change is effected by varying the speed of the driving motor 3. The manner in which this is accomplished may be understood by referring to Figs. 1 to 5 inclusive. For example if the pressure falls below the desired value and operation of the damper to the position represented by the line $x_1$ in Fig. 1 is insufficient to restore the pressure to the desired value the damper is moved slightly beyond this position so that contact point 32 engages contact 35 and contact point 31 engages contact 34, thus completing the circuit of motor 45 as follows (see Figs. 2 and 3): From line 11 through wire 40, contacts 34 and 31, and wire 42 to the motor 45, and thence back through wire 43, contacts 32 and 35 and wire 41 to the line. Motor 45 is thereby energized and caused to rotate in such direction as to decrease the effective resistance of rheostat 51, thereby increasing the speed of motor 3 and fan 2 so as to again bring the pressure at 7 up to the desired value. As a matter of fact the pressure is first increased somewhat beyond the desired value in order to cause the regulator to operate to move the damper toward closed position sufficiently to break the connection between contacts 31 and 34 and 32 and 35, the pressure being thus brought back to the desired value and motor 45 being at the same time de-energized so as to leave the driving motor 3 again running at constant speed but at a somewhat greater speed than before.

If on the other hand the pressure at 7 becomes too great in spite of the movement of the damper to the position indicated by line $x_2$, the commutator is operated to complete the other operating circuit for motor 45, that is to say a connection is closed between contacts 33 and 35 and between contacts 32 and 34. The circuit is now completed through wire 40, contacts 34 and 32, and wire 43 to motor 45 and thence through wire 44, contacts 33 and 35 and wire 41 back to the line. Motor 45 will therefore be caused to rotate in the reverse direction to that above described and will operate to increase the effective resistance of rheostat 51 and thereby decrease the speed of motor 3 and fan 2. The pressure is thus reduced to slightly below the desired value causing the damper 6 to be operated sufficiently toward open position to bring it back within the prescribed zone of travel, thereby breaking the connection at the commutator and again placing the control of the fluid pressure under the influence of the damper alone.

In the above described manner small variations of pressure are corrected by operation of the damper 6 within the limits $x_1$ and $x_2$, while any sudden or large variations in the pressure requirements cause such damper to be moved under the influence of said regulator slightly beyond one or the other of these limits thereby automatically causing the speed of the fan to be decreased or increased sufficiently to permit the desired pressure to be restored while causing the damper to be returned to a position within the prescribed zone.

By adjusting the wedge-shaped contact members 34 and 35 up or down in the slots 39, the angle through which shaft 13 must turn in order to cause contact between such members and the contact points 31 to 33 may be varied, thus varying the angle A through which the damper 6 is permitted to turn without influencing the speed of fan 2. Furthermore the regulator may be set to maintain any desired pressure, for example by raising or lowering the contact mechanism comprising contact lever 105 and contacts 107 to 110 with respect to the normal liquid level in the float chamber, or by varying the total amount of liquid in the float chamber and the pressure chamber. It should be noted that the setting of the regulator to maintain a given pressure not only controls the operation of the regulator but also indirectly controls the adjustment of the fan speed.

In case the supply of the electric current to the motors 9 and 10 of the regulator should fail from any cause whatever, solenoid 74 which is included in the electrical supply circuit for such motors will be de-energized thus releasing plunger 72 which is forced outward by spring 75 and operates releasing finger 69 to the position indicated in dotted lines at 69' in Fig. 9. Catch member 64 is thus released and is operated by spring 68 to a position such as indicated in dotted lines at 64' in Fig. 7. Lug 66 is thus moved out of engagement with pin 67 on tripping lever 66 and said lever is caused to swing by weight 61, the pin 62 on said lever engaging arm 55 in this movement. The sudden force thus applied to arm 55 causes the connection to be broken between clutch members 22 and 23 due to the resiliently supported balls 26 slipping out of recesses or notches 27, and the tripping arm 55, damper shaft 21, and damper 6 are thus left free to turn independently of operating shaft 13. Weight 61 continues to swing the tripping lever 56 to the position indicated at 56', and tripping arm 55 is thus brought to the position indicated at 55', in Fig. 7. Since the arm 55 is shown as substantially parallel to the damper 6 it will be seen that this operation brings said damper to a position parallel to the length of flue 1 or to wide-open position. This prevents any damage to any parts of the system for example injury to the flue or to the fan due to excessive pressure which might result if the damper were allowed to remain in partly closed position with the regulator inoperative due to power failure. Furthermore, in case the apparatus is used in connection with the supply of gas to a distributing system from a gasometer at a gas works as above described, and the electric power fails completely, both motor 3 and the regulator will be disabled, and it is therefore of great advantage to have the damper moved to wide open position, so as to permit the full pressure of the gasometer to be applied to the distributing system.

The operation of releasing finger 69 above described also moves spring member 85 to the position shown in Fig. 13 and in dotted lines in Fig. 9, so as to break connection between contacts 89 and 90 and close connection between contacts 87 and 88. Furthermore the movement of the damper to wide open position causes arm 86 to be moved in a clockwise direction to the position indicated in Fig. 13 and at 86′ in Fig. 7. This brings pin 84 out of engagement with spring member 83, permitting said spring member to operate to break connection between contacts 79 and 80 and close connection between contacts 81 and 82, as shown in Fig. 13.

The manner in which the device operates to restore the damper to operative position upon re-establishment of the operating circuits for the regulator is as follows:

The contact devices being in the position shown in Fig. 13, a circuit is first established from the line 11 through wires 119 and 121, contact members 88 and 87, wires 124 and 125, electro-magnet 111, and wires 132 and 134 back to the line. Motor 9 is thus caused to rotate at increased speed so as to rotate the operating shaft 13 in counter clock-wise direction as indicated at 97 in Fig. 7, that is in the direction which would normally tend to close the damper. The damper is not moved in this operation, however, due to the disengagement of the clutch means between the operating shaft 13 and the damper shaft 21. In the rotation of the operating shaft in this direction, however, arm 78 engages pin 62 on tripping lever 56⁰ and carries this lever around with it to the normal position of the lever, leaving arm 55 in its position parallel to the length of the flue. Lever 56 in moving back to its normal position will engage finger 93 on catch member 64 and restore said catch member to normal position, thus causing the other end of catch member 64 to pass beyond the releasing finger 69 so as to permit plunger 72 to be attracted by solenoid 74, which is now energized due to the energization of the regulator operating circuit. This will in turn cause releasing finger 69 to be restored to normal position to engage catch member 64 and hold the same in position to again retain the tripping lever 56 in normal or inoperative position. This movement of releasing finger 69 also releases spring contact member 85 so as to break connection between contact members 87 and 88 and restore connection between contact members 89 and 90. The circuit controlling the speed of motor 9 is thus broken at this point, while at the same time the corresponding circuit is completed for motor 10 as follows. Through wires 119 and 121, contact members 89 and 90, wires 127 and 126, contact members 82 and 81, wires 130 and 131, electromagnet 112 and wires 133 and 134. The speed of motor 10 is thus increased while motor 9 runs at normal speed and operating shaft 13 is thus caused to rotate in the reverse or clock-wise direction. This rotation continues until the operating shaft reaches its normal position with respect to the damper shaft at which time the clutch device 22, 23, again engages due to the balls 26 reentering their proper sockets 27. Restoration of the operating shaft to this position causes arm 86 to be brought back to its normal position so that lug 84 re-engages the outer end of spring contact member 83 and moves the same to position to break connection between contacts 81 and 82 and close connection between contacts 79 and 80. It should be noted in this connection that the clutch balls 26 and sockets 27 may be so formed as to cause the clutch to snap into position thus giving a quick throw to the spring contact member 83 and ensuring positive operation of the contact members controlled thereby. The damper is thus placed in operative connection with the operating shaft 13 so as to be again under control of the regulator and the entire system is thus restored to its original condition so as to operate as above described to maintain the desired pressure in the flue.

Many other types of regulators may be employed to operate the damper in connection with my invention. For example as shown in Fig. 14 I may use a regulator comprising a single electrical motor 140 connected through gearing indicated at 141 to the operating shaft 13 which is connected as before through suitable clutch means for example as above described to the damper shaft 21. Motor 140 is of the reversible type and is adapted to rotate in one direction or the other upon the establishment of one or the other of the two operating circuits 142 and 143. Circuit 142 includes contact means 144 adapted to be closed upon energization of electro-magnet 145 due to closing of contact means 107 and 109 which occurs as before upon raising of the float 100. Circuit 143 includes similar contact means 146 adapted to be closed by electromagnet 147 which is energized upon closing of contact means 108 and 110 due to lowering of float 100. Said operating circuits 142 and 143 are connected to motor 140 so as to provide a different phase relation upon completion of the respective circuits, the relation being such that establishment of circuit 142 causes motor 140 to rotate in such direction as to move the damper toward closed position while establishment of circuit 143 causes said motor to rotate in the reverse direction and move the damper toward open position.

Float control means and electrical control circuits and contact means may be provided in connection with this type of regulator, which may as shown be substantially similar to those above described and similar means may also be provided for effecting tripping of the damper and restoration thereof, and for causing any movement of the damper beyond either limits of a certain zone to influence the speed of the fan motor to restore the desired pressure and permit the damper to return within its zone of travel.

The operation of this form of the invention will be readily understood from the above description, an increase in pressure serving to cause motor 140 to move the damper toward closed position and a decrease in pressure operating to move the damper toward open position. Motion of the damper beyond the desired limits of travel will as before cause a change in the speed of the fan motor 3 so as to permit the desired pressure to be maintained and at the same time permit the damper to remain within the desired zone of travel. Furthermore, as before, failure of the electric current will cause the damper to be released, and the subsequent establishment of the circuit will cause the regulator to operate, with the aid of the contact means above described, to restore the tripping means to normal position and cause the clutch means between the operating shaft and damper shaft to be re-engaged.

The invention is not limited to application in connection with electrically operated regulators but may also be used in connection with mechanical regulators, for example, regulators operated by water, steam, air, or other fluid pressure. The apparatus shown in Figs. 15 to 18 inclusive illustrates a regulator of this type. The operating shaft 13 for the damper 6 is shown as connected by means of crank arm 150 and connecting rod 151 to a piston 152 working in cylinder 153. Said piston is adapted to be moved in one direction or the other in said cylinder upon application of fluid pressure to one side or the other thereof and hence cause opening and closing movement of damper 6. For this purpose valve 154 may be provided, comprising a plunger 155 having two valve pistons 156 and 157, adapted to control communication between inlet port 158 and outlet ports 159 and 160, and passages 161 and 162 communicating with the interior of cylinder 153 at the respective ends thereof. Plunger 155 may be adapted to be pulled in one direction or the other upon energization of one or the other of the electromagnets 163 and 164, suitable springs 165 being provided for returning the plunger to neutral or inoperative position as indicated in Fig. 16 when the electromagnets are de-energized. Electromagnet 164 may be connected in circuit with contact means 107 and 109 by means of wires 166, 167, and 168 and electromagnet 163 may be connected in series with contact means 108 and 110 by means of wires 169, 170, and 168. Suitable float means similar to those above described may be provided for controlling connection between said contact means so as to control the energization of electromagnets 163 and 164 and hence control the operation of the regulator. Shaft 13 may as before be provided with contact segment 30 having contacts 31, 32, and 33 adapted to cooperate with contacts 34 and 35 to cause operation of the motor 45 controlling the fan motor rheostat as above described, when the damper reaches either limits of its desired travel.

In operation, if the pressure increases above the desired point connection will be closed between contact members 107 and 109 and electromagnet 164 will be energized and attract plunger 155 to such position as to establish communication between inlet port 158 and passage 152 and between passage 151 and outlet port 159. Inlet port 158 may be connected to any suitable source of fluid pressure, for example, to a source of water supply and upon movement of the plunger as above described such fluid pressure will be admitted through passage 152 to the left end of cylinder 153 and cause piston 152 to be operated so as to move damper 6 towards closed position and restore the pressure to the desired point. Reduction in pressure will cause movement of the valve in the reverse direction so as to cause reverse movement of piston 152 and hence open the damper. It will be understood that the outlet pipes 159 and 160 are adapted to permit free discharge of fluid therethrough so that the fluid may escape from either end of cylinder 153 which is in communication with one of said outlets. This form of regulator is adapted as above described to maintain the pressure at the desired point by operation of the damper as long as the damper remains within the prescribed zone of travel it will operate through the contact means 31 to 35 inclusive to control the speed of the fan motor as in the case first described.

Any of the regulating systems above described may be used to maintain either a positive pressure or a vacuum, and the damper or flow controlling device may be placed either after or before the fan or fluid moving device. In the case of maintaining a vacuum, the fluid moving device may be an exhausting fan drawing air, gas, or other fluid through a flue or from a chamber and the flow controlling device is in such case preferably located before the fan, the system being adapted to maintain a constant vacuum at a point either before the flow controlling device or between such device and the fluid moving device. My invention may in general be applied in connection with any regulating device for operating a flow controlling device, whether for the purpose of maintaining a certain pressure (positive or negative) or a certain volume flow, or for any other purpose.

The use of the above described invention is of particular advantage in cases where considerable variations are apt to occur in the demand or consumption of gas or other fluid and in which a constant pressure is to be maintained regardless of the demand. An example of this is in the supply of fuel or illuminating gas to the distributing system of large gas companies. In this case the consumption varies to a marked degree, and if constant pressure regulation is maintained by operation of a damper or valve alone, the fan must be kept in operation at a speed sufficient to take care of the maximum consumption, and at times of low demand the damper will be held in nearly closed position. This obviously means wasted energy in driving the fan at unnecessarily high speed. On the other hand it is impracticable to provide for continually changing the speed of the fan to correct small variations in pressure. By means of my invention the small variations may be smoothed out by operation of the damper, with the fan running at approximately the speed required, while large fluctuations cause the fan speed to be automatically adjusted.

I claim:

1. An apparatus for fluid pressure regulation comprising in combination with means defining a fluid passage, fluid moving means adapted to produce flow of fluid in said passage, variable speed driving means for said fluid moving means, a flow controlling device situated in said passage, a regulating device operatively connected to said flow controlling device and provided with control means connected to said passage so as to be responsive to variations in pressure therein, speed controlling means for said variable speed driving means and means operatively connected to said flow controlling means for controlling the operation of said speed controlling means, whereby movement of such flow controlling means beyond a prescribed position is adapted to cause operation of said speed controlling means.

2. An apparatus for fluid pressure regulation comprising in combination with means defining a fluid passage, fluid moving means adapted to produce flow of fluid in said passage, variable speed driving means for said fluid moving means, flow controlling means in said passage, a regulating device responsive to variations in pressure conditions in said passage and connected to said flow controlling means to operate the same to correct such variations in pressure conditions and speed control means operable to change the speed of said variable speed driving means upon movement of the flow controlling means beyond a certain position.

3. An apparatus for fluid pressure regulation comprising in combination with means defining a fluid passage, fluid moving means adapted to produce flow of fluid in said passage, a variable speed electric motor connected to drive said fluid moving means, electrically operated means for controlling the speed of said electric motor, flow controlling means in said passage, automatic pressure regulating means connected to operate said flow controlling means to maintain a constant pressure in said passage, an electric circuit for controlling said speed controlling means for the electric motor, and contact means included in said electric circuit and operable to close said circuit and effect operation of said speed controlling means upon movement of said flow controlling means beyond a certain position.

4. In combination with means defining a fluid passage and an automatically operated flow controlling device therein, fluid moving means adapted to produce flow of fluid in said passage, and means for varying the fluid moving power of said fluid moving means when said flow controlling device moves beyond a certain position.

5. In an apparatus for fluid pressure regulation, a flow controlling device, automatic regulating means therefor, a fluid moving device, variable speed driving means therefor, and means whereby movement of said flow controlling device beyond a certain position causes a change in speed of said driving means.

6. In an apparatus for fluid pressure regulation, a flow-controlling device, a regulator, releasable clutch means connecting said regulator to said flow controlling device, a source of motive power for said regulator, and means operable upon the failure of said source of motive power and adapted to release said clutch means and move said flow controlling device to a position of substantially maximum opening.

7. In an apparatus for fluid pressure regulation, a flow controlling device, an electrically operated regulator, releasable clutch means connecting said regulator to said flow controlling device, tripping means operable to release said clutch means and move said flow controlling device to a position of substantially maximum opening, means for normally holding said tripping means from so operating, electric operating circuit means for said regulator, electromagnetic means included in said electric means, and means cooperating with said electromagnetic means and operable upon de-energization thereof due to failure of the current in said electric circuit to release said holding means and permit operation of said tripping means.

8. An apparatus as set forth in claim 7, and comprising in addition electrical control circuits for said regulator and contact means associated therewith and operable upon operation of said holding and tripping means to place such circuits in condition so that upon re-establishment of the current in the operating circuit means said regulator operates to restore the holding and tripping means to normal position and to effect re-engagement of said clutch means.

In testimony whereof I have hereunto subscribed my name this twenty-fifth day of June, 1925.

FLOYD H. VIETS.